Jan. 25, 1966     R. E. HOFFMAN ETAL     3,230,582
PLASTIC PELLETIZER
Filed Feb. 27, 1963     3 Sheets-Sheet 1
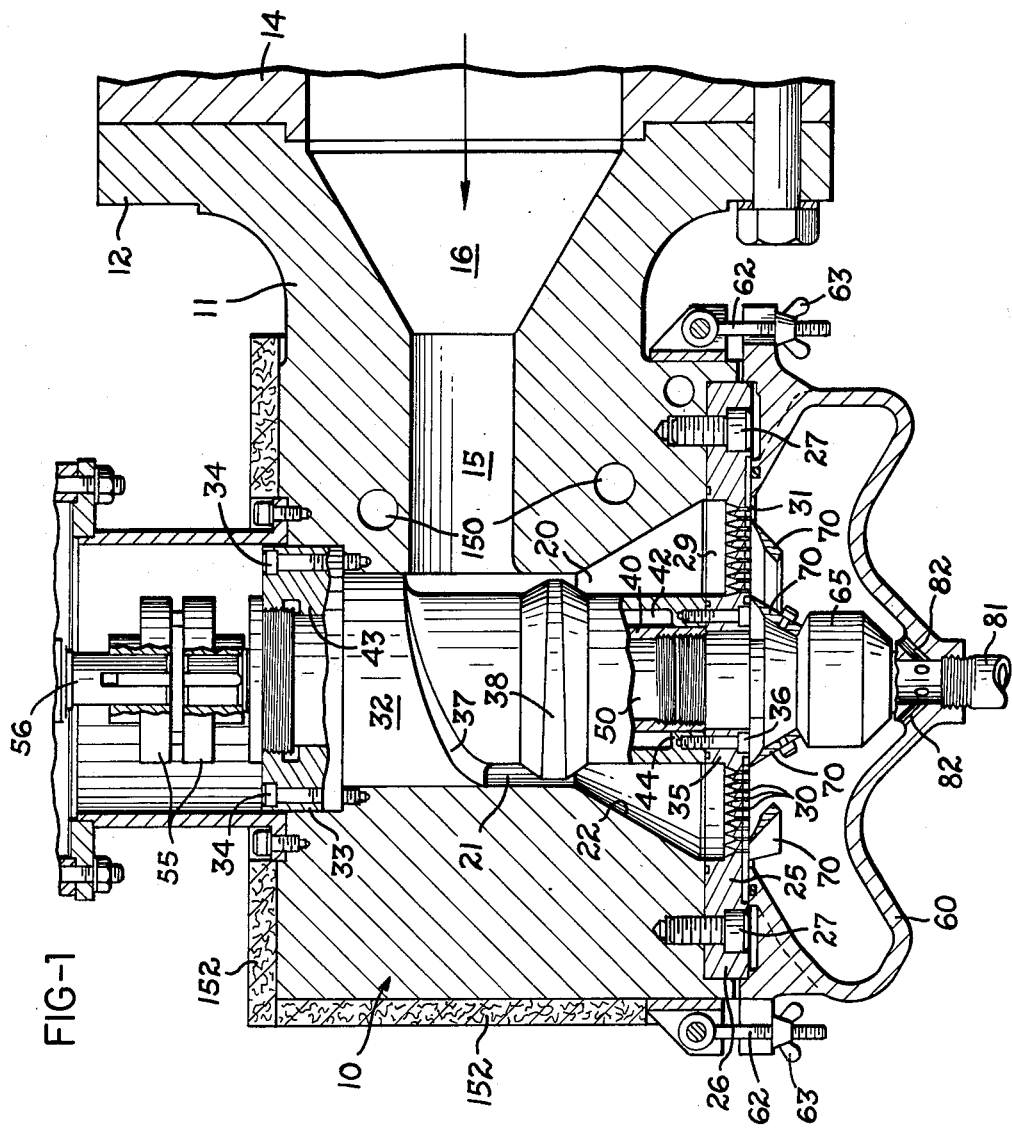
INVENTORS
ROBERT E. HOFFMAN &
BY  H. PAUL KOPPEHELE
Marechal, Biebel, French & Bugg
ATTORNEYS Jan. 25, 1966    R. E. HOFFMAN ETAL    3,230,582
PLASTIC PELLETIZER
Filed Feb. 27, 1963    3 Sheets-Sheet 2
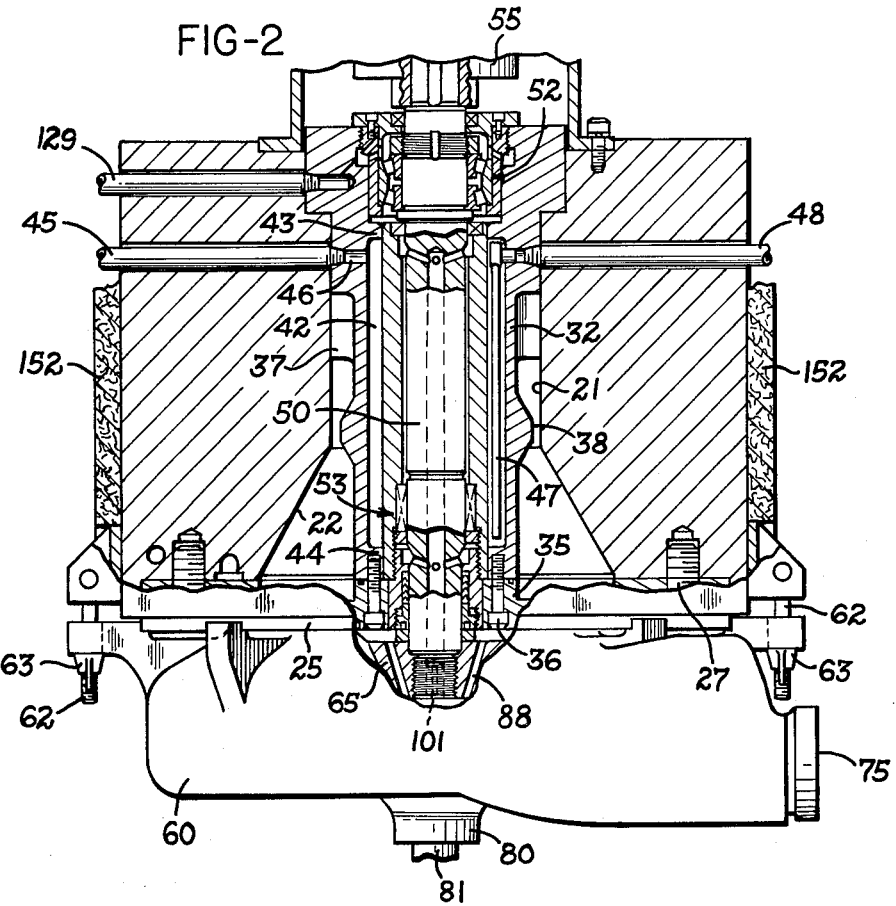
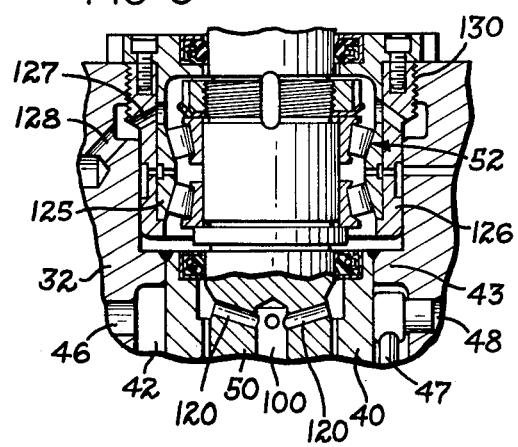
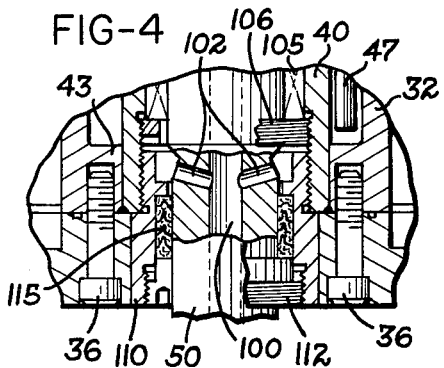
INVENTORS
ROBERT E. HOFFMAN &
BY H. PAUL KOPPEHELE
ATTORNEYS Jan. 25, 1966    R. E. HOFFMAN ETAL    3,230,582
PLASTIC PELLETIZER
Filed Feb. 27, 1963    3 Sheets-Sheet 3
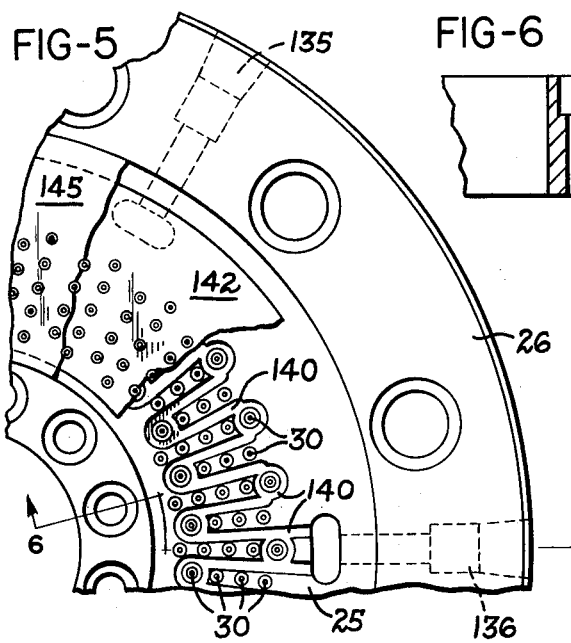
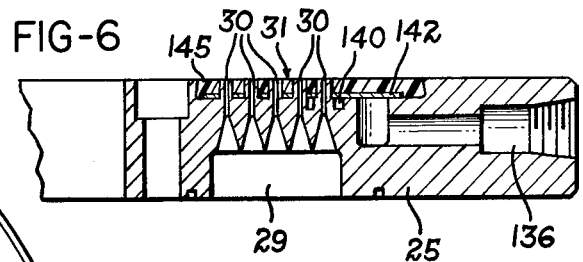
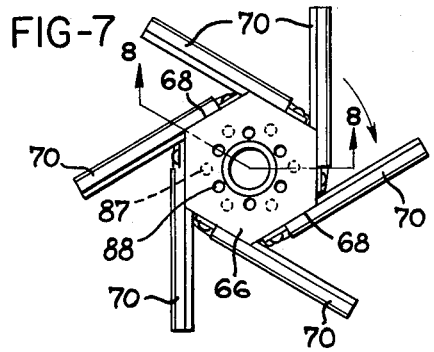
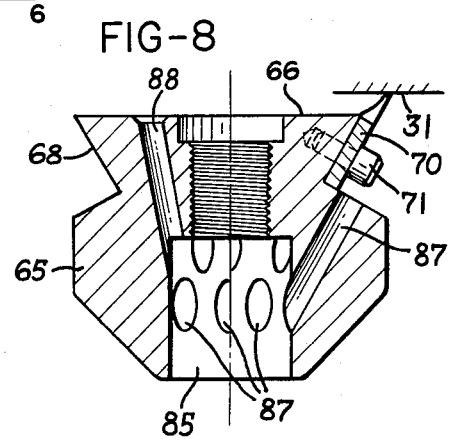
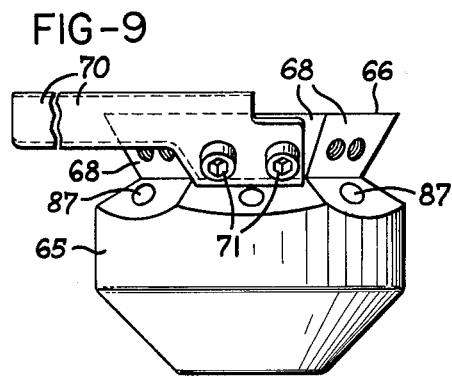
INVENTORS
ROBERT E. HOFFMAN &
BY H. PAUL KOPPEHELE
ATTORNEYS United States Patent Office 3,230,582
Patented Jan. 25, 1966

3,230,582
PLASTIC PELLETIZER
Robert E. Hoffman, Akron, and Hugo Paul Koppehele, Stow, Ohio, assignors to The Black-Clawson Company, Hamilton, Ohio, a corporation of Ohio
Filed Feb. 27, 1963, Ser. No. 261,382
10 Claims. (Cl. 18—12)

This apparatus relates to plastic converters and more particularly to a pelletizer.

An important object of this invention is to provide a plastic pelletizer characterized by a high capacity and an ability to operate continuously over extended periods of time.

Another object of this invention is to provide a pelletizer having a die plate of relatively small thickness at the extruding zone for increased nozzle capacity, and reduced chilling and back pressure.

A further object of this invention is the provision of a plastic pelletizer having a thin heated die plate.

A further object of this invention is the provision of a pelletizer having a mandrel received within the extruding cavity which may be heated and which may include a choke for distributing the plastic material uniformly to the die plate.

Another object of this invention is the provision of a pelletizer including an arrangement for the application of heat internally to prevent chilling of the plastic.

A still further object of this invention is the provision of a pelletizer with a knife cutting under water wherein a stream of water is applied immediately behind the knife blades to prevent caviatation and ahead of the knife to entrain the newly formed pellets.

A further object of this invention is the provision of a pelletizer for plastic wherein the knife hub is formed with internal water passages which direct streams of water ahead of the knives to entrain the cut pellets and behind the knives to prevent cavitation.

Another object of this invention is the provision in a pelletizer of an arrangement of cooling the bearings of the knife shaft, while applying heat to maintain the temperature of the plastic.

A still further object of this invention is the provision of a pelletizer for hot plastic having water lubricated bearings and a water passage in the knife shaft for applying cooling and lubricating water to the shaft bearings.

These and other advantages of the invention will be apparent from the following description, the accompanying drawings and the appended claims.

In the drawings:

FIG. 1 is a vertical section through a pelletizer constructed according to this invention, with the section taken longitudinally of the extruder;

FIG. 2 is a partial vertical section through a pelletizer on a plane normal to that of FIG. 1;

FIG. 3 is an enlarged fragmentary detail of the upper shaft bearing assembly;

FIG. 4 is an enlarged fragmentary detail of the lower shaft bearing assembly and shaft packing arrangement;

FIG. 5 is a fragmentary partially broken away plan view of a portion of a die plate modified for heating, looking at the inside or cutting surface thereof;

FIG. 6 is a transverse section through a portion of the die plate of FIG. 5 taken generally along the line 6—6 of FIG. 5;

FIG. 7 is a plan view of the hub and knife assembly looking at the inside or bottom of the hub;

FIG. 8 is an enlarged transverse section through the hub with one knife blade attached taken generally along the line 8—8 of FIG. 7; and FIG. 9 is an elevation of the hub with one of the blades attached.

Referring to the drawings which illustrate a preferred embodiment of the invention, a pelletizer constructed according to this invention is shown in FIGS. 1 and 2 as including a body 10. The body 10 is formed with a neck 11 on one side thereof terminating in a flange 12 for mounting directly onto the end of a barrel 14 of a screw type extruder. It will be understood that the extruder barrel may contain the usual screw, breaker plate, and screen pack, which are not shown and form no part of the present invention. Also, the invention is not limited for use on screw type extruders and may be used with plastic pumps and the like.

The body 10 at the neck 11 forms a longitudinally extending passageway 15 leading from a flared inlet opening 16 at the flange 12 to an extrusion cavity 20 formed within the body 10. As shown in FIG. 1, the body 10 is formed with a generally vertically extending cylinder bore 21 intersecting the passageway 15 and terminating in an outwardly flared or conical wall portion 22 which defines the outer dimension of the cavity 20.

The outlet to the extrusion cavity 20 at the base of the wall portion 22 is closed by an annular die plate 25. The die plate 25 is formed with an outer thickened ring portion 26 secured by machine bolts 27 within a suitably formed recess to the lower face of the body 10 in closing relation to the extrusion cavity 20. As shown in FIG. 1, and in enlarged detail in FIGS. 5 and 6, the die plate 25 includes an annular extruding zone 29 having a plurality of extrusion nozzles or orifices 30 formed therethrough. The orifices are arranged annularly within the zone 29 in concentric rows in communication with the cavity 20, and terminate with protruding ends in a common extruding plane to form a knife cutting surface 31.

Means for centrally supporting the die plate 25 includes a fixed hollow mandrel 32 removably received in the bore 21. The upper end of the mandrel 32 is flanged at 33 and retained by bolts 34 in sealing and closing relation to the cylinder bore 21.

The lower end of the mandrel 32 is of reduced diameter and extends into the cavity 20. An inside thickened central portion 35 of the die plate 25 inwardly of the extruding orifices 30 is secured to and supported on the lower terminal end of the mandrel 32 by bolts 36. In this manner, the annular die plate 25 is supported peripherally at the outer ring portion 26 and centrally at the inside portion 35 to provide a rigid structure permitting the extruding zone 29 to be made considerably thinner than would otherwise be possible, providing nozzles or orifices 30 of controlled and desirably small length for high capacity.

The reduced lower end of the mandrel 32 forms a forwardly and downwardly inclined radially extending wall 37 leading from the inlet passageway 15 to the cavity 20. The wall 37 provides a smooth entry for the plastic melt and changes the direction of flow from horizontal to vertical, and is free of stagnant or dead corners in which plastic may carbonize. The mandrel 32 also may be provided with an integral choke 38 within the bore 21 immediately above the wall 22. The choke 38 may be asymmetrical, as required to assure uniform distribution of the melt about the mandrel 32 and into the extrusion cavity 22.

The mandrel 32 is hollow to receive a knife shaft supporting sleeve 40 therein, as clearly shown in FIG. 2. The sleeve 40 and mandrel 32 defines an annular water tight clearance space 42 therebetween. The space 42 is closed adjacent the top and bottom of the mandrel 32 by bosses 43 and 44 which engage the outer surface of the sleeve 40 near the ends thereof, thus forming a space for the flow of a suitable heating fluid therein. The heating medium may be steam which is admitted into the clearance space 42 through an inlet pipe 45 extending through the body 10 into a suitable opening 46 taped through the wall of the mandrel 32. Steam condensate may be removed by a standpipe 47 connecting with an outlet pipe 48, as shown in FIG. 2. Thus, the clearance space 42 defined between the mandrel and the shaft supporting sleeve 40 provides the means by which heat may be applied interiorly of the mandrel for maintaining the desired temperature of the plastic material being extruded and for preventing the chilling which would otherwise occur at the outer surface of the mandrel.

A knife shaft 50 is rotatably mounted within the sleeve 40 on an upper bearing assembly 52 and a lower bearing assembly 53 and extends at its upper end above the body 10 for connection with a flexible drive coupling 55, and drive motor shaft 56. The lower end of the shaft 50 is proportioned to extend through the mandrel below the die plate 25 into the interior of a water-tight, pellet-collecting housing 60. The housing 60 is secured to the lower face of the body 10 in enclosing relation to the die plate 25, and is retained in place on the body 10 by a plurality of swing bolts 62 and wing nuts 63, as shown in FIGS. 1 and 2.

The lower end of the shaft 50 supports a knife hub 65. The hub 65, as shown in FIGS. 7–9, has a radial flat inner face 66 and is preferably formed with a plurality of equally spaced flats 68 for supporting knife blades 70 secured thereto by screws 71. As shown in FIGS. 8 and 9, the flats 68 are inclined inwardly toward the axis of rotation with increasing distance from the die plate to support the knife blade 70 at a rake or angle to the cutting surface 31 of the extruding plate 25 so that the plastic material extruded through the orifices is severed with a component of the knife motion tending to lift or separate the individual pellets from the cutting surface 31.

As shown in FIG. 7, the knives 70 are mounted on the flats 68 so as to lie generally tangent to a circle which has its center of rotation that of the axis of the shaft 50, so that the knives effect a radially outward sweeping and shearing movement as they rotate over the die surface 31. Also, the rotation of the hub 65 and knives 70 displaces the water within the housing 60 and pumps water and entrained pellets through the housing outlet 75, shown in FIG. 2.

The housing 60 includes a centrally located water inlet 80 which is aligned generally on the axis of the hub 65 and shaft 50. The housing 60 at the inlet is suitably tapped to connect to a water pipe 81, and is formed with a plurality of outwardly extending discharge openings 82 for admitting water directly into the interior of the housing 60.

The hub 65 is formed with an axial water inlet recess 85 formed partially therethrough, as shown in FIG. 8, which communicates with a plurality of outer and inner passageways. The hub 65 is provided with preferably at least one outer passageway 87 for each knife blade 70, opening to discharge water ahead of the turning knife blade. The inner passages 88 open at the base 66 of the hub. There is preferably at least one inner passage 88 for each blade, and each applies water from the water inlet 80 immediately behind one of the knife blades 70 to prevent cavitation.

Means for cooling the bearing assemblies 52 and 53 includes an axial bore 100 (FIG. 2) formed partially through the length of the shaft 50 and opening at the lower end into the interior of the hub 65 at a metering plug 101 to receive water from the hub inlet recess 85. The lower end of the shaft 50 is shown in enlarged detail in FIG. 4 as being provided with a pair of radially extending passages 102 communicating with the bore 100 for supplying cooling water directly to the lower bearing assembly 53, which includes a water-lubricating needle bearing 105 held in place within the sleeve 40 by a retainer 106. A packing gland assembly including an outer packing ring 110 threaded into the lower end of sleeve 40 and an inner ring 112 threaded in the ring 110 with the compressed packing rings 115 therebetween serving effectively to seal the lower end of the shaft 50.

As shown in FIG. 3, the upper end of the shaft 50 is formed with a pair of water passages 120 leading from the bore 100 to the upper bearing assembly 52. The upper assembly 52 may contain a double conical water-lubricating bearing race 125 received within a bearing cup 126 in the upper end of the mandrel 32. The cup 126 and the mandrel 32 may be suitably tapped as indicated at 127 and 128 for connecting with a drain pipe 129 in the body 10 for removing the excess cooling water from the assembly 52. Means for adjusting the hub 65 and knife blades 70 with respect to the cutting surface 31 of the die plate 25 includes the cup 120 which is threaded into the upper end of the mandrel at 130. The rotation of the cup 120 provides the longitudinal adjustment of the position of the shaft 50 within the sleeve 40 to bring the knife blades 70 into sweeping or shearing contact with the face of the die 25.

For certain applications, it may be desirable to add heat to the die plate to compensate for the chilling action of the water within the housing 60 and to provide more efficient extruding action through the nozzles 30. The heating of the die plate has been accomplished in this invention without increasing the overall length of the nozzles thereby maintaining an optimum design of the nozzles. It is well known to those skilled in the art that the length of the extrusion nozzle is critical to the optimum operation of the pelletizer, since nozzles of too great a length have a shearing effect and may change the the chemical characteristics of the plastic material being extruded. This invention has the advantage of providing a die plate wherein the extruding zone 29 at the nozzles may be relatively thin and may be designed without sacrificing strength in the die plate necessary to withstand the extruding pressure applied thereto.

Referring particularly to FIGS. 6 and 7, it can be seen that the die plate 25 is provided with means defining a fluid inlet passage 135 and a fluid outlet passage 136, a plurality of which may be circumferentially located within the die plate to provide a short path between the inlets and outlets. The lower surface of the die plate, at the extruding zone, is machined to form a fluid passageway 140 lying in a plane generally transverse to the nozzles and adjacent the nozzles conducting relation thereto. As shown in FIG. 6, the passageways 140 may take the form of a serpentine-like conduit machined within the die plate 25 extending between and opening into the liquid inlets and outlets 135, 136.

Means for enclosing the passageway 140 may be a thin annular metal plate 142 which has been suitably drilled or perforated to receive the nozzles and which is positioned over the ends of the nozzles against the die plate in closing relation to the passageways 140, and suitably bonded or welded in position. Insulating means may then be formed about the nozzles, and may include a sheet or thickness of insulating material 145, such as a silicone plastic, which is packed under pressure into the interstices between the terminal ends of the nozzles 30 against the plate 142 under high pressure, and cured in place. The cutting surface 31 of the die plate may then be formed such as by grinding to provide a smooth surface against which the knives operate to shear off pellets of plastic as it is extruded through the nozzles 30.

The die body 10 may be provided with means for applying heat thereto for maintaining the temperature of the plastic at a desired temperature, and to this end passageways 150 may be formed through the die body and connected with corresponding transverse passageways, forming a box or encircling passageways of square or H configuration, according to the manner well known in the art. Induction heating as described and claimed in the copending application of Kullgren et al, Serial No. 110,502, filed May 16, 1961, now Patent No. 3,129,459, may be employed to heat the die body 10. The exposed surfaces of the die body may be protected with pads 152 of insulation.

In the operation of this invention, the shaft 50 is rotated by the flexible coupling 55 by any suitable means, such as by an electric motor mounted directly on the body 10, and accordingly may rotate at 1725 r.p.m., for instance, although shaft speeds of 500 to 2500 r.p.m. may be used. The plastic melt is applied from the extruder barrel 14 to the inlet passageway 15 of the body 10 where it is uniformly distributed between the mandrel 32 and the cylinder bore 21 by the inclined wall 37 and choke 38 of the mandrel 32. The plastic in the cavity 20 is extruded through the orifices 30 within the die plate 25 and severed by the rotating knives 70 on the hub 65.

Water preferably under a positive head is applied into the interior of the housing 60 at the inlet 80. A major portion of this water flows through the discharge openings 82 into the interior of the housing. The pumping action of the blades will cause a positive differential between the inlet 80 and the combined water and plastic outlet 75. Additional water is applied through hub openings 87 and 88 both ahead of and behind the blades 70 to entrain the pellets and carry them rapidly away from the die plate 25 toward the outlet 75.

A small portion of the water is applied through the plug 101 in the bore 100 of the shaft 50, to the bearing assemblies 52 and 53. This lubricating and cooling water supply is removed through the passages 127, 128, and the drain pipe 129, and serves to lubricate and cool the shaft bearings.

The temperature of the plastic may be maintained by the heating of the die body by any suitable means, such as the application of steam or hot oil through the passageways 140. Also, the interior of the mandrel 32 may be heated, as desired, by the application of steam or other suitable heating medium into the clearance space 42.

The use of the internal heat will depend largely upon the type of plastic being extruded. Also, it is within the scope of this invention to apply cooling to the clearance space 42, as desired, in appropriate circumstances. The die plate may be heated as desired according to the type of plastic being extruded, by the application of hot oil or steam to the inlets 135 for flow within the die plate 25 about the nozzles.

The pelletizer of this invention is characterized by the ease by which it may be cleaned to remove carbonized plastic material after substantial periods of use. The mandrel 32 with the assembled sleeve 40 and shaft 50 are removable from the extrusion cavity 20 as a unit thereby exposing for cleaning the entire interior of the cavity 20 and the passageway 15. At the same time, the exterior surfaces of the mandrel may be readily cleaned on a bench, and the die plate 25 may be removed and cleaned.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An underwater plastic pelletizer comprising a die plate supporting body having means defining an extrusion cavity therein including an inlet and an outlet, an annular die plate on said body positioned in closing relation to said outlet and having means therein defining a plurality of extrusion orifices arranged annularly thereon in communication with said cavity, means for centrally supporting said die plate including a fixed hollow mandrel extending into said cavity and having an upper end thereof secured in said body and having a lower end thereof secured in supporting relation to said die plate at an inside peripheral portion thereof inwardly of said orifices, said mandrel defining with said cavity an annular extrusion passage leading from said die body inlet to said outlet, a knife drive shaft, means rotatably mounting said drive shaft within said sleeve with a lower end of said drive shaft extending below said die plate, a knife hub mounted on the extended end of said shaft, and a plurality of pellet severing knives fixed to said hub and extending therefrom for sweeping said die plate at said orifices upon the rotation of said shaft, a pellet collecting water-tight housing secured to said die body over said die plate and hub having water inlet means and combined water and pellet outlet means, means in said hub defining a plurality of water passageways positioned to receive water from said water inlet with at least one such passageway for each said blade arranged to direct water behind said blades to prevent cavitation between said blades and said die plate, and further means in said housing forming a water discharge opening adjacent said hub communicating with said housing inlet for admitting water directly into the interior of said housing.

2. A plastic pelletizer comprising, a die body having means defining a plastic inlet for receiving hot plastic directly from the barrel of an extruder and having an extrusion cavity communicating with said inlet, a die plate circumferentially mounted on said body in closing relation to said cavity, means in said die plate defining an open center and an annular extrusion zone including a plurality of extrusion nozzles therein, a mandrel extending through said cavity supported at one end at said body and connected centrally of said die plate at an inner end thereof supporting said die plate inwardly of said zone, a knife shaft in said mandrel extending through said open center and having a knife and hub assembly on the extended end thereof adjacent the outer surface of said die plate with knives positioned to move over said zone to effect the shearing of plastic extruded through said nozzles into pellets, means rotatably mounting said shaft in said mandrel, a pellet collecting housing on said body enclosing said hub assembly and die plate and having a water inlet and a combined water and pellet outlet, water inlet means in said hub assembly positioned to receive water from said inlet, and means in said hub assembly defining a plurality of water passages for directing water ahead of and behind the knives mounted thereon.

3. A plastic pelletizer comprising, a die body having means defining a plastic inlet for receiving hot plastic directly from the barrel of an extruder and having an extrusion cavity communicating with said inlet, a die plate circumferentially mounted on said body in closing relation to said cavity, means in said die plate defining an open center and an annular extrusion zone including a plurality of extrusion nozzles therein, a mandrel extending through said cavity suported at one end at said body and connected centrally of said die plate at an inner end thereof supporting said die plate inwardly of said zone, a knife shaft rotatably mounted in said mandrel and extending through said open center of said die plate, a hub mounted on an extended end of said shaft, a plurality of knives mounted on said hub generally tangent to a circle concentric with the axis of said hub, said hub being formed with an inner face adjacent said die plate, a pellet collecting housing on said body enclosing said die plate and having a water inlet and a combined water and pellet outlet, and means in said hub defining a plurality of water passages including inner passages opening at said face for directing water behind said knives and outer passages opening to direct water ahead of said knives.

4. A side entry plastic pelletizer comprising, a die body having means defining a plastic inlet passageway for receiving hot plastic directly from the barrel of an extruder and having a cylindrical bore intersecting said passageway and terminating in an extrusion cavity, a die plate circumferentially mounted on said body in closing relation to said cavity, means in said die plate defining an annular extrusion zone including a plurality of concentric rows of extrusion nozzles therein, a mandrel extending through said bore and said cavity supported at one end at said body in closing relation to said bore and connected centrally of said die plate at an inner end thereof supporting said die inwardly of said zone, the lower end of said mandrel formed of reduced dimension compared to said bore forming a generally radial wall leading smoothly from said inlet passageway and curving toward said cavity providing for a change in direction of the flow of plastic from said passageway to said cavity, means in said mandrel forming an asymmetrical choke in said bore spaced downstream from said radial wall and formed to provide a greater restriction to flow on the side of said mandrel remote from said inlet intersection providing for uniform flow of plastic material annularly to said extrusion zone a knife shaft rotatably received in said mandrel extending through said open center, and a knife hub assembly on said shaft adjacent the outer surface of said die plate for effecting the shearing of plastic extruded through said nozzles into pellets upon the rotation of said shaft.

5. The pelletizer of claim 4 including means in said die plate defining generally radially disposed passageways having alternate ends connected to form a serpentine-like passage for the application of heat to said nozzles, and means connected to apply a heating fluid to said passageways.

6. A side entry plastic pelletizer comprising, a die body having means defining a plastic inlet for receiving molten plastic and a bore in intersecting relation to said inlet and terminating in an extrusion cavity communicating with said inlet, a die plate mounted on said body in closing relation to one end of said cavity spaced from said inlet intersection, means in said die plate defining an annular extrusion zone including a plurality of concentric rows of extrusion nozzles therein, a mandrel extending through said bore into said cavity and supported at one end on said body and supported on the other end on said die plate inwardly of said extrusion zone, said body at said cavity being formed with a generally conical wall leading from a point spaced from said die plate and diverging outwardly and terminating at said die plate radially outwardly of said extrusion zone, and means on said mandrel forming an asymmetrical choke between said cavity and said plastic inlet having greater restrictive effect to the flow of plastic material on the side of said cavity remote from said plastic inlet for distributing the molten plastic uniformly into the space defined by said generally conical body wall providing for the uniform distribution of plastic material annularly of said extrusion zone.

7. In an underwater plastic pelletizer having a die plate for the extrusion of plastic therethrough for severing into pellets by rotating knives, the improvement comprising a die plate body having means therein defining a plurality of extrusion nozzles arranged in concentric annular rows and terminating at a common surface defining a knife cutting plane, means in said plate forming a recess surrounding each of said nozzles at the orifices thereof, an insulating sheet of plastic material packed under pressure into said recess in surrounding relation to said nozzles and having an exposed surface lying generally in said cutting plane confining contact of said body with water to said nozzle surfaces, and means in said die plate body defining a heating passageway axially inwardly of said plastic sheet and adjacent to the said nozzles for the application of heat to said nozzles.

8. In a plastic pelletizer having a die body containing a die plate for the extrusion of plastic therethrough and a pellet collecting housing on said body and enclosing said die plate, the improvement comprising a shaft rotatably mounted in said body, water inlet means in said housing for directing a flow of water into the interior thereof for entraining cut pellets, a hub and knife assembly on said shaft including cutting knives rotatable adjacent said die plate and a knife hub having means therein forming a water inlet positioned to receive water from said housing inlet, and a plurality of water outlet passageways opening into said inlet including a first set of said passageways for directing water behind the knives for preventing cavitation and a second set of passageways positioned to direct water ahead of said knives for entrainment of cut pellets.

9. In a pelletizer in which cutting knives sever pellets from a die plate under water, an improved die plate construction comprising a die plate body, means in said body defining a plurality of nozzle orifices arranged in radial rows forming an annular pattern of nozzle orifices extending generally axially therethrough, means in said body forming a recess surrounding said nozzle orifices with each of said orifices being defined by a nozzle portion which is raised in relation to the surrounding body surface and terminating in a cutting plane common with all of the nozzle portions, and a layer of insulating material in said recess in surrounding relation to each of said nozzle portions and having an exposed surface lying generally in said cutting plane confining contact of water with said body to the exposed nozzle portions, means in said body defining a plurality of generally radially extending heating passageways spaced between said rows of orifices and extending effectively the full radial extent of said nozzle pattern and having alternate ends of adjacent heating passageways connected to form a continuous serpentine-like flow path for distributing heating fluid to each of said nozzle orifices to provide uniform heating of the die plate.

10. The pelletizer of claim 1 in which said means rotatably mounting said drive shaft within said sleeve includes a water lubricated bearing, means in said shaft defining a water passage adapted to receive water from said inlet and opening into said bearing providing for the flow of water therethrough, and means in said body defining an outlet for the removal of excess water from said bearing resulting in a flow of lubricating water to said bearing.

References Cited by the Examiner
UNITED STATES PATENTS

| | | | |
|---|---|---|---|
| 940,244 | 11/1909 | Friedenthal | 165—164 |
| 2,759,219 | 8/1956 | Meakin | 18—12 |
| 2,834,054 | 5/1958 | Maddock et al. | |
| 2,918,701 | 12/1959 | Hull | 18—1 |
| 3,029,466 | 4/1962 | Guill | 18—1 |
| 3,079,636 | 3/1963 | Aykanian | 18—14 |
| 3,114,169 | 12/1963 | Palmer et al. | 18—12 |

WILLIAM J. STEPHENSON, *Primary Examiner.*

MICHAEL V. BRINIDISI, *Examiner.*

L. S. SQUIRES, *Assistant Examiner.*